United States Patent
Friedrichs et al.

(10) Patent No.: US 9,203,854 B2
(45) Date of Patent: *Dec. 1, 2015

(54) METHOD AND APPARATUS FOR DETECTING MALICIOUS SOFTWARE USING MACHINE LEARNING TECHNIQUES

(71) Applicant: Cisco Technology, Inc., San Jose, CA (US)

(72) Inventors: Oliver Friedrichs, Woodside, CA (US); Alfred Huger, Calgary (CA); Adam J. O'Donnell, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/505,837

(22) Filed: Oct. 3, 2014

(65) Prior Publication Data
US 2015/0026810 A1   Jan. 22, 2015

Related U.S. Application Data

(63) Continuation of application No. 13/308,533, filed on Nov. 30, 2011, now Pat. No. 8,875,286.

(60) Provisional application No. 61/418,514, filed on Dec. 1, 2010, provisional application No. 61/418,532, filed on Dec. 1, 2010, provisional application No. 61/418,547, filed on Dec. 1, 2010, provisional application No. 61/418,580, filed on Dec. 1, 2010.

(51) Int. Cl.
*G06F 11/00* (2006.01)
*H04L 29/06* (2006.01)
*G06F 21/56* (2013.01)

(52) U.S. Cl.
CPC .......... *H04L 63/1416* (2013.01); *G06F 21/564* (2013.01)

(58) Field of Classification Search
CPC ............ H04L 63/1416; H04L 63/1408; H04L 63/1425; H04L 63/145; H04L 63/1441; H04L 63/14; H04L 63/1458; H04L 63/1433; G06F 21/56; G06F 21/566; G06F 21/55; G06F 21/562
See application file for complete search history.

(56) References Cited

U.S. PATENT DOCUMENTS 7,487,544 B2 *   2/2009   Schultz et al. .................. 726/24
7,690,037 B1 *   3/2010   Hartmann ....................... 726/23

(Continued)

FOREIGN PATENT DOCUMENTS

| EP | 2199941 A2 | 6/2010 |
| EP | 2199941 A3 | 4/2012 |
| WO | 2010115959 A1 | 10/2010 |

OTHER PUBLICATIONS

International Search Report in corresponding International Application No. PCT/US2011/062957, mailed Apr. 4, 2012, 2 pages.

(Continued)

*Primary Examiner* — Fikremariam A Yalew
(74) *Attorney, Agent, or Firm* — Edell, Shapiro & Finnan, LLC

(57) ABSTRACT

Novel methods, components, and systems for detecting malicious software in a proactive manner are presented. More specifically, we describe methods, components, and systems that leverage machine learning techniques to detect malicious software. The disclosed invention provides a significant improvement with regard to detection capabilities compared to previous approaches.

20 Claims, 6 Drawing Sheets

(56) References Cited

U.S. PATENT DOCUMENTS

| | | | |
|---|---|---|---|
| 7,779,262 B2* | 8/2010 | Kim et al. | 713/180 |
| 8,161,548 B1* | 4/2012 | Wan | 726/22 |
| 2006/0026675 A1 | 2/2006 | Cai et al. | |
| 2006/0037080 A1 | 2/2006 | Maloof | |
| 2006/0126522 A1 | 6/2006 | Oh | |
| 2007/0016953 A1 | 1/2007 | Morris et al. | |
| 2007/0150954 A1 | 6/2007 | Shon | |
| 2009/0049549 A1* | 2/2009 | Park et al. | 726/22 |
| 2009/0254992 A1* | 10/2009 | Schultz et al. | 726/24 |
| 2009/0300761 A1 | 12/2009 | Park et al. | |
| 2010/0017877 A1 | 1/2010 | Cooley et al. | |
| 2012/0158626 A1 | 6/2012 | Zhu et al. | |
| 2012/0210423 A1* | 8/2012 | Friedrichs et al. | 726/22 |

OTHER PUBLICATIONS

Extended European Search Report in corresponding European Application No. 11844348.0, mailed Jun. 24, 2014, 8 pages.

* cited by examiner

METHOD AND APPARATUS FOR DETECTING MALICIOUS SOFTWARE USING MACHINE LEARNING TECHNIQUES

CROSS-REFERENCE TO RELATED APPLICATIONS

This application is a continuation of U.S. patent application Ser. No. 13/308,533, filed Nov. 30, 2011, which in turn claims priority to U.S. Provisional Patent Application No. 61/418,514, filed on Dec. 1, 2012, U.S. Provisional Patent Application No. 61/418,532, filed on Dec. 1, 2010, U.S. Provisional Patent Application No. 61/418,547, filed on Dec. 1, 2010 and U.S. Provisional Patent Application No. 61/418,580, filed on Dec. 1, 2010. The entirety of each of these applications is incorporated herein by reference.

FIELD OF THE INVENTION

The present invention relates to the security of general purpose computing devices and more specifically to the detection of malicious software (malware) on a general purpose computing device.

BACKGROUND OF THE INVENTION

It is known in the art that each day, many tens of thousands of new malicious software programs are discovered. These programs can compromise the security of general computing devices. Possible security violations include, but are not limited to, the theft of data from the system, the usurping of the system for other nefarious purpose (like sending spam email), and, in general, the remote control of the system for other malicious actions.

One popular technique in the art for detecting malicious software comprises the following steps:

a. Establishing through some independent means that the application is malicious (e.g., by manually analyzing it).
b. Computing a hash or fingerprint of this software. A hash is a mathematical transformation that takes the underlying binary contents of a software application and produces a relatively short string, with the idea being that two different applications will, with overwhelmingly high probability, have distinct fingerprint values. Common functions for performing this fingerprinting or hashing step include SHA-256, SHA-1, MD5, and others. Besides hash and fingerprint, another term used in the art to describe this transformation is a signature. For the purposes of this invention, the terms hash, fingerprint, and signature will be used interchangeably.
c. Publishing this hash so that it is accessible to end-users operating a general purpose computing device.
d. Having the device compare this fingerprint with the fingerprint of any new software applications that have arrived on the system.
e. Applying a set of steps based on a given policy if the fingerprints match (e.g., blocking the installation of the application).

The above technique suffers from the drawback that it only works when an application is determined to be malicious ahead of time. Put differently, it is a reactive approach. It is understood in the art that oftentimes superficial changes to a malicious application will cause it to have a different fingerprint even though the underlying actions of the application continue to be malicious. If the fingerprint changes, then it will no longer match the one that was initially established for the application, and consequently the application can potentially evade detection by anti-malware technology. Indeed, the explosion in malware instances appears to be a result of malware authors making frequent, but innocuous, changes to a smaller number of applications rather than creating entirely new applications.

There is, accordingly, a need in the art to develop methods, components, and systems for detecting malicious software in a proactive form that addresses the above limitations.

SUMMARY OF THE INVENTION

According to one aspect of the present invention, a system is provided that uses machine learning techniques to identify a software application as malicious. The system comprises the following phases. First, there is a training phase in which a corpus of training data is used to derive a model. The model takes as input a feature vector that can be derived by applying a mathematical transformation to a software application. Second, there is a feature extraction phase in which a client system can extract a feature vector from a potentially malicious software application and either evaluate it directly using the model or transmit it to a back-end server for evaluation. Third, there is an evaluation phase wherein the model is applied to the extracted feature vector to determine whether the application of interest is likely malicious or benign (optionally producing not just a binary classification but possibly a score that represents the likelihood of this distinction—e.g., a score from 0 to 100 where 0 represents that an application is with overwhelming likelihood clean and 100 means an application is with overwhelming likelihood malign). Fourth, based on this determination, an appropriate policy may be applied. According to another aspect of the present invention, one or more server-side components are presented that may perform the training phase. In one embodiment, the data used to derive the model can be taken directly from transaction logs of actual client systems that communicate with the server side component. The methods by which training can be done include, but are not limited to, Support Vector Machines, Neural Networks, Decision Trees, naive Bayes, Logistic Regression, and other techniques from supervised, semi-supervised, and unsupervised learning. The training or "model-derivation" aspect of the invention may be practiced with any of the above techniques so long as they can yield a method for classifying software applications. Once the training is complete and a model is derived, the server side component can automatically create a module that uses the model to evaluate the feature vectors of new software instances.

According to another aspect of the present invention, a client-side component is provided that may perform the following steps: first, extract relevant feature vector values from a software application; second, optionally compare these values to a local model to determine if the application is malicious or benign or requires further investigation; third, optionally compress the feature vector so that it can be encoded in with a small number of bytes; fourth, transmit the (compressed or uncompressed) feature vector to a server; fifth, apply a policy based on the server's response. The policy based on the server's response might include, but would not be limited to one or more options. First, if the application is conclusively malicious, the client side component may remove it from the system or block any installation attempt by the user. Second, if the application is possibly, but not conclusively malicious, the client side component may transmit a copy of the application itself to the server for subsequent more extensive processing and analysis. According to another aspect of the present invention, a server-side component is provided that may perform the following steps: first, receive a feature vector (that was transmitted by the client); second, optionally decompress this feature vector if it was compressed by the client; third, evaluate this feature vector and determine how likely it is to be malicious; fourth, transmit this information to the client together with optional instructions for how the client should respond. Note that in one embodiment of the present invention, the actual policy for how to handle different server responses can be stored on the client itself, and the server can provide a simple response. According to another aspect of the present invention, a method is provided for training a model that can be used to determine if a software application is potentially malicious. The method can potentially leverage actual in-field usage data. According to another aspect of the present invention, a method is provided for a client to extract a feature vector from a software application together with related contextual information on the system, (optionally) compress this information, and then transmit it to a server-side component. According to another aspect of the present invention, a server-side component is provided that can take a possibly compressed feature vector, decompress it if is compressed, evaluate the feature vector against a model, compare the results to those achieved from other methods for identifying malicious software, and then provide a disposition to a client.

DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

The subsequent description of the preferred embodiments of the present invention refers to the attached drawings, wherein.

DETAILED DESCRIPTION OF THE INVENTION

Figure 1:
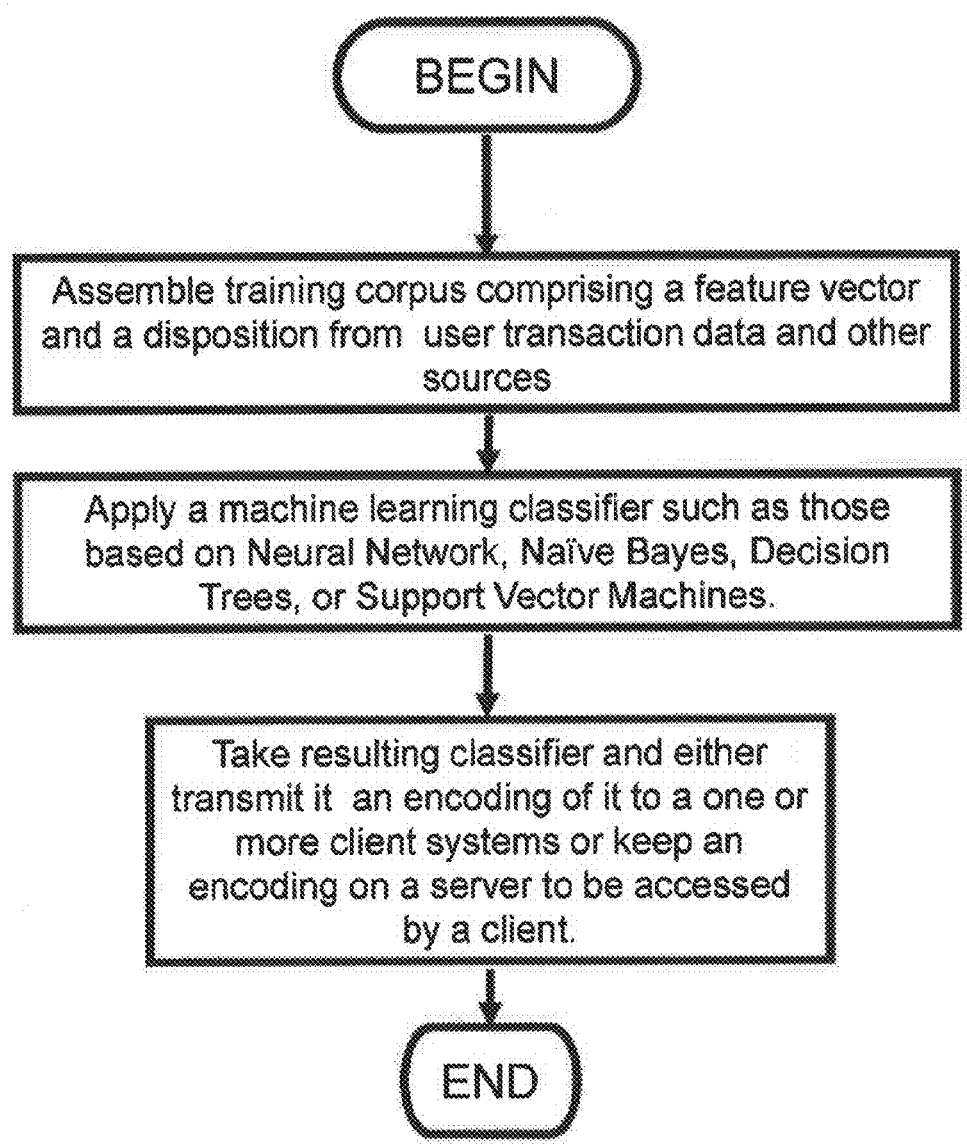
FIG. 1 represents a flowchart of the training procedure in accordance with an embodiment of the present invention.
Figure 2:
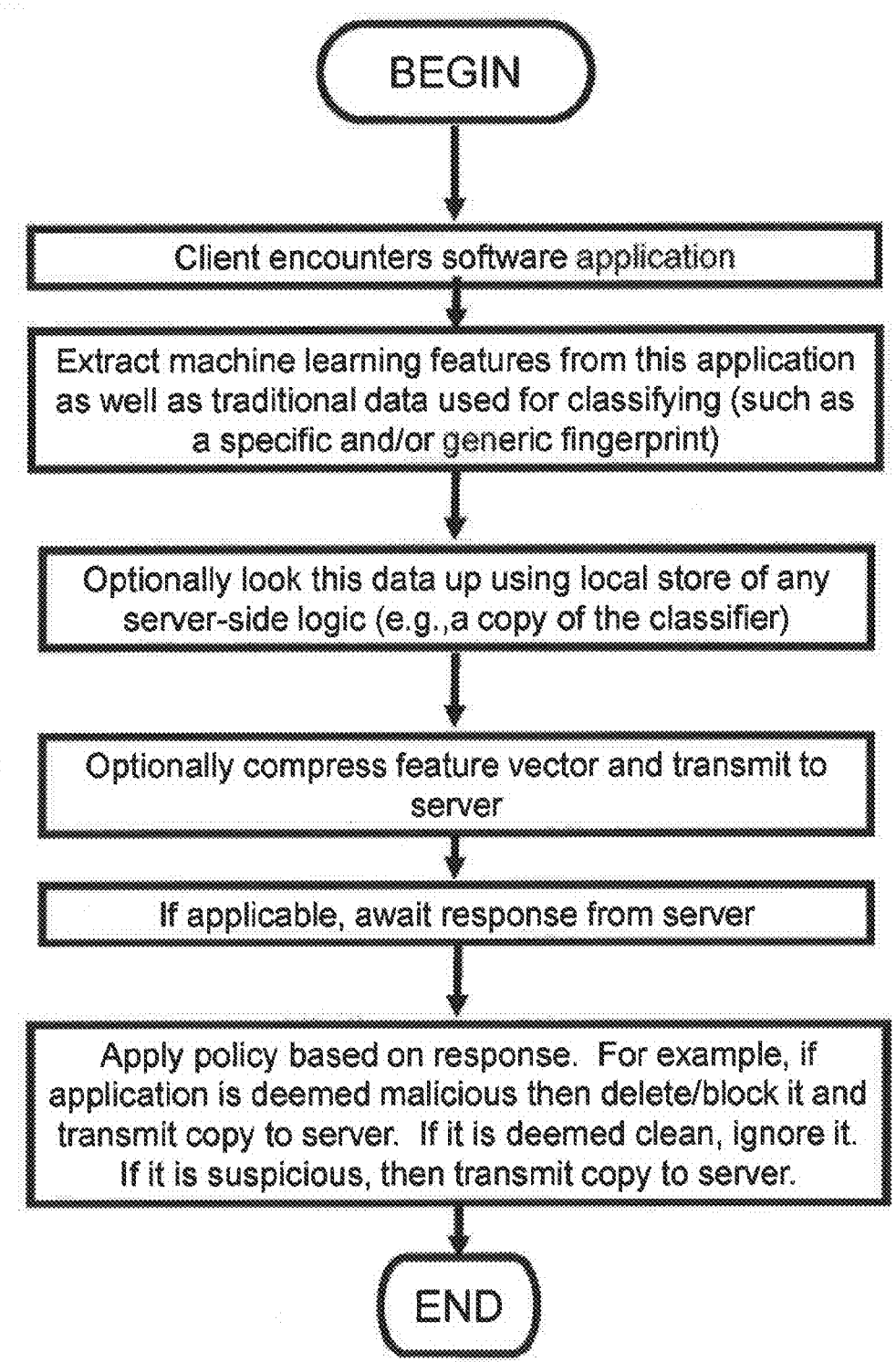
FIG. 2 represents a flowchart of a client-side feature extraction method in accordance with an embodiment of the present invention.
Figure 3:
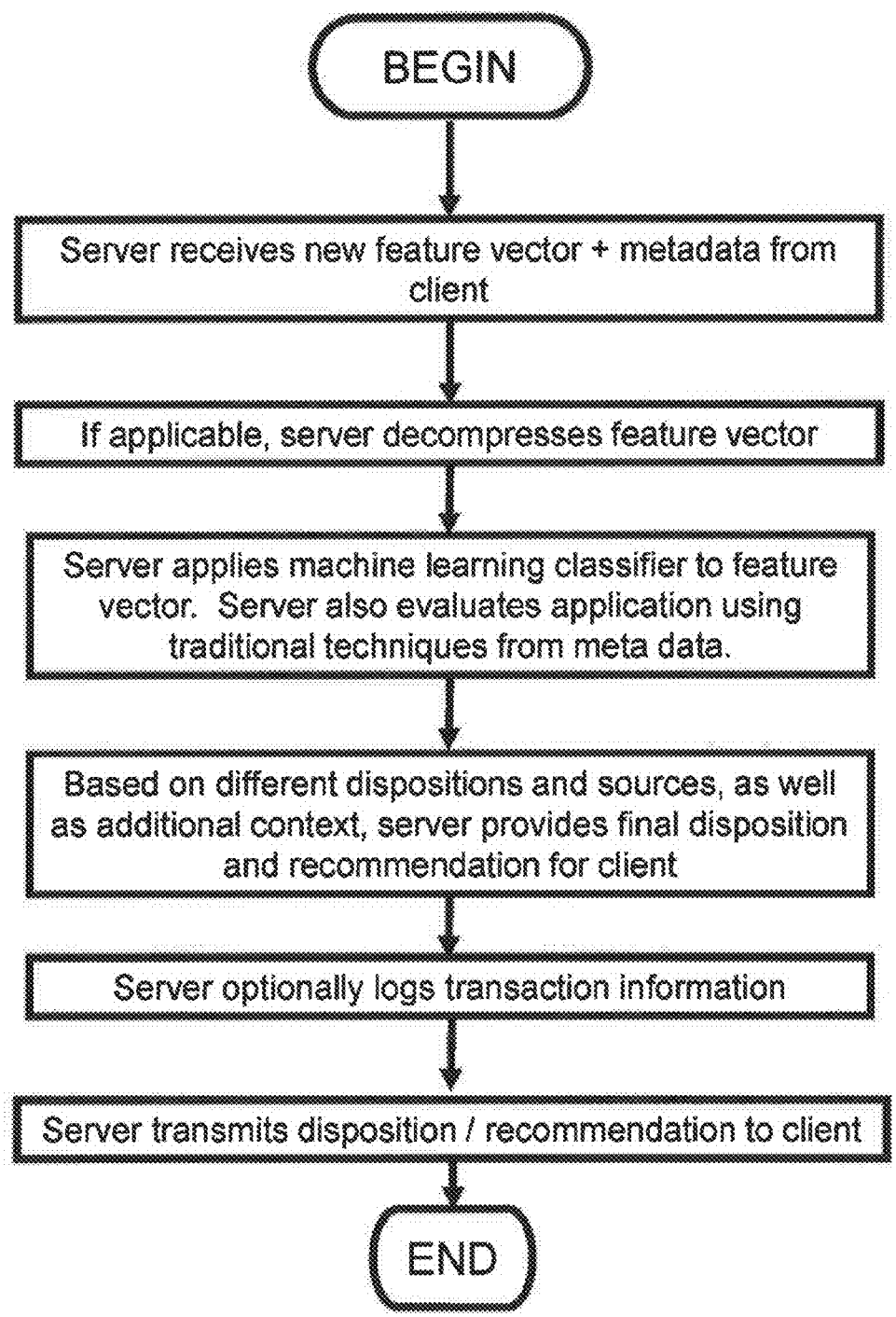
FIG. 3 represents a flowchart of the server-side evaluation method in accordance with an embodiment of the present invention.
Figure 4:
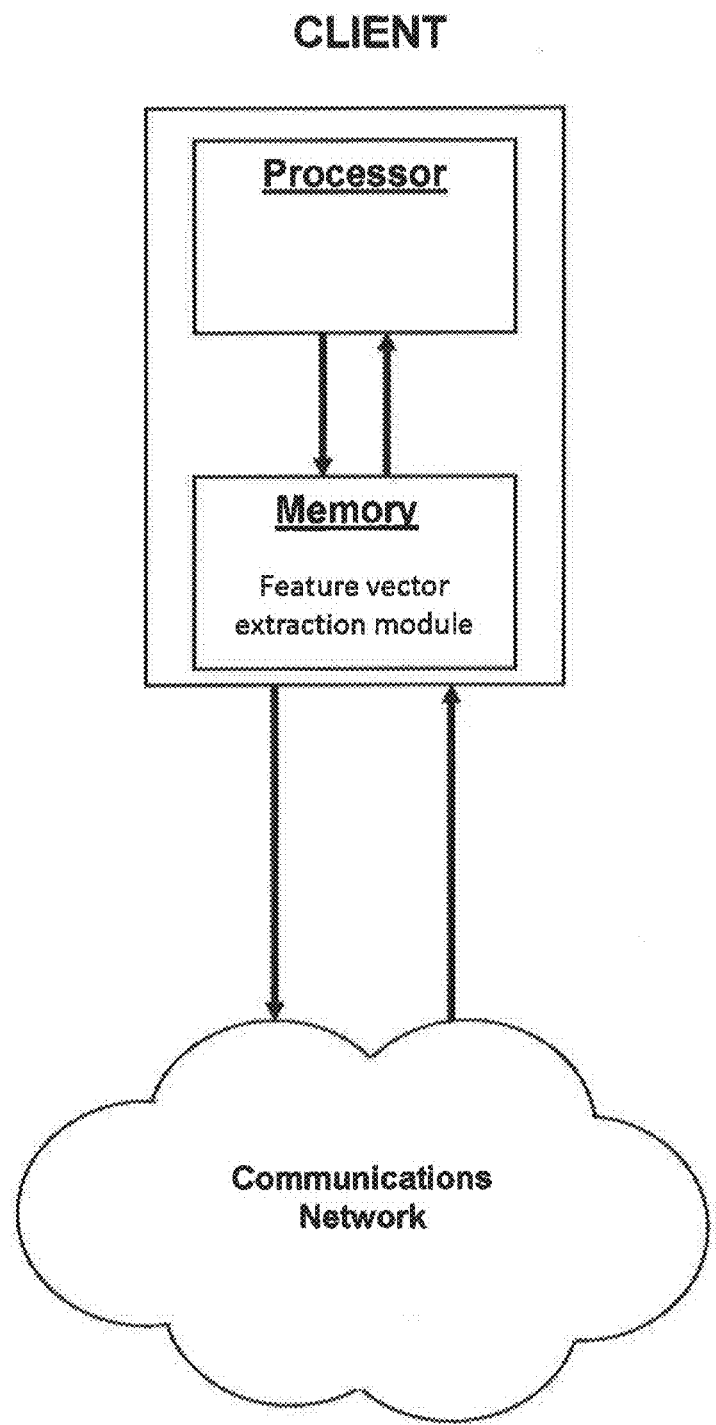
FIG. 4 is a representation of a client component including a feature vector extraction module in accordance with an embodiment of the invention.
Figure 5:
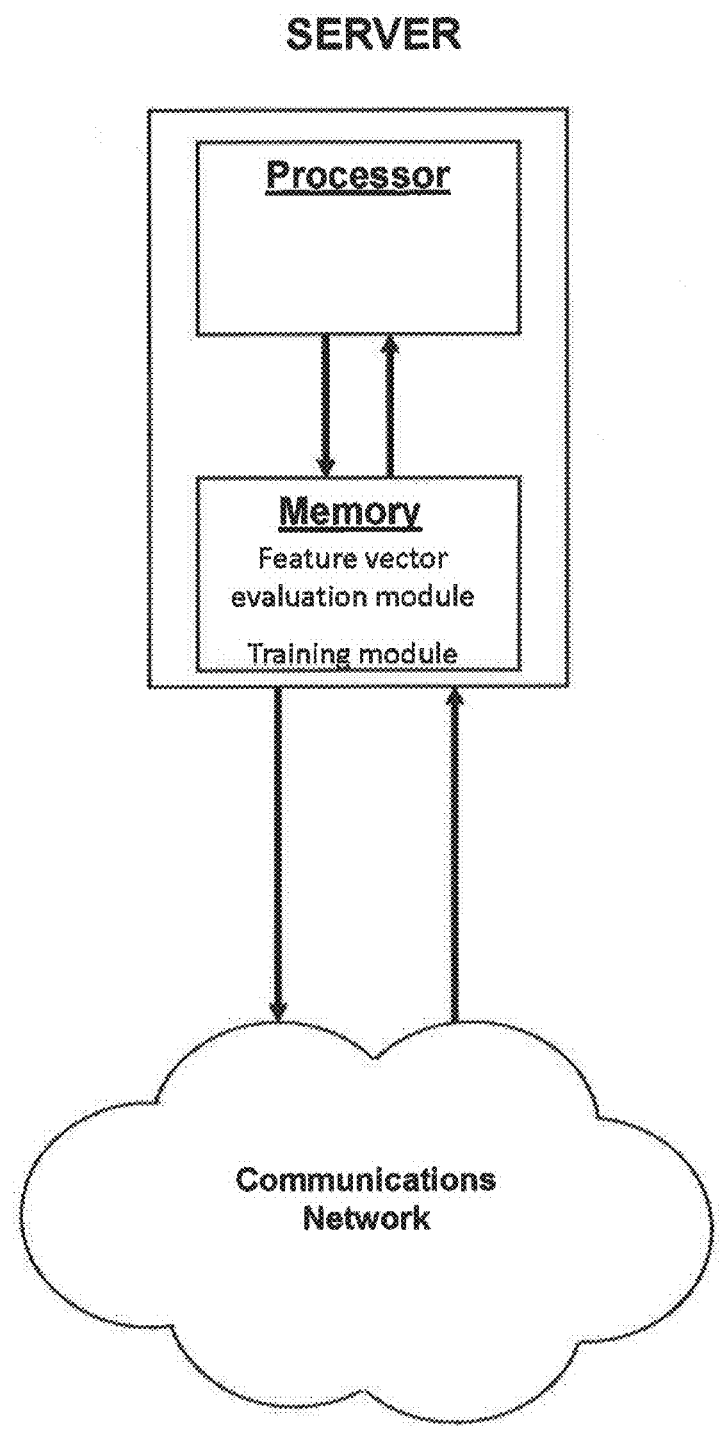
FIG. 5 is representation of a server component including a feature vector evaluation model and a training module in accordance with an embodiment of the present invention.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These descriptions and representations are the means used by those skilled in the data processing arts to most effectively convey the substance of their work to others skilled in the art. The steps described herein are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The descriptions presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein. A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

The description that follows will reference terminology that is generally known in the art. In the art, the term malware refers to a malicious software application. Such an application can have a number of nefarious purposes. For example, malware can be used to perform a number of malicious actions. These actions include, but are not limited to: stealing digital information from a victim's machine; using the victim's machine in the perpetration of other malicious activities (such as sending out unsolicited email messages or spam); remotely controlling the victim's machine; and inhibiting the machine from operating normally. In the art, a computer virus is generally considered one example of malicious software. In addition to computer viruses, other types of malware in the art include Trojans, Worms, Downloaders, and Misleading Applications.

It is understood that the maliciousness of an application can be subjective; it often depends on the user and typically includes a well-defined set of rules. For the purposes of this disclosure, a malicious application shall be understood to mean an application that is unwelcome to the user.

In the art, the term false positive references a situation in which an otherwise legitimate application is accidentally deemed malicious. Similarly, a true positive references a situation in which a malicious application is correctly identified as such. It is therefore the objective of anti-malware software to achieve a high true positive rate while having a low false positive rate.

In the art, the term signature references a relatively short sequence of values that can be used to identify if an application is malicious or not. In its most general incarnation, the signature is computed as a transformation applied to an entire software application. In the art, a signature is typically computed (e.g., by an anti-malware technology vendor) on a known piece of malware. The signature is either transmitted onto a client's system or it is stored on a server. When a client encounters a new piece of software, it will compute a signature on that software, and determine if that signature matches one associated with a known piece of malicious software either by checking its local data store or by querying a server. It is understood in the art that a signature can either be specific or generic. If two software applications have the same specific signature, then with overwhelming likelihood, these two applications are entirely identical. One example of a specific signature in the art is a SHA-256 hash. A generic signature permits that possibility that variations on a given application will continue to have the same signature. If an application is taken, and superficial changes are made to it, then the generic signature on this application might continue to be the same as the original whereas a specific signature on it will with extremely high likelihood be different from that computed on the original. One example of a generic signature in the art is the PEhash. Another example of a generic signature in the art is ssdeep.

In the art, the term fingerprint is often associated with a traditional signature and the term fuzzy fingerprint is often associated with a generic signature. In the art, the term conviction refers to a situation in which a piece of software is identified as malicious on a client system.

In the art, the term digital signature refers to a standard technology for computing a relatively short string from a file using techniques from the field of public-key cryptography. The transformation to compute the string from the file requires the use of a so-called private signing key. A public verification can be used to determine if a purported signature on a file has been correctly computed. A secure signature scheme is such that without knowledge of the private signing key, it is computationally infeasible for one to compute a signature that will be construed as valid. A digital signature should not be confused with the types of signatures mentioned above for detecting malicious applications (even though in the art these notions all use the term "signature").

The following description will also reference terminology from the field of machine learning, and may be known to one skilled in the art. For the sake of clarity, some relevant terminology from the field of machine learning will be reviewed. In its simplest form, machine learning techniques can be used to classify objects into one of a plurality of sets. Within the context of anti-malware solutions, machine learning techniques may be used to identify whether a given software application is likely to be malicious or benign, and potentially produce a score that reflects the confidence in that classification.

In the following, the nomenclature associated with machine learning techniques will be described in reference to their application towards the classification of software applications as malicious or benign.

Machine learning approaches first tend to involve what is known in the art as a training phase. In the context of classifying software applications as benign or malicious, a training "corpus" is first constructed. This corpus typically comprises a set of software applications. Each application in this set is optionally accompanied with a "label" of it disposition, for example "benign", "malign", or "unknown". The labels can be determined either through manual analysis or through some other independent and possibly more expensive means. It is desirable to have fewer unknown samples. Furthermore, it is desirable for the corpus to be representative of the real world scenarios in which the machine learning techniques will ultimately be applied. For example, in the context of classifying software applications, it might be desirable if the applications in the corpus are reflective of what might be found on a typical end-user computer system. In the first phase of the training process, a feature vector is extracted from each software application. A feature vector is a series of values that represent the salient features of an application in the corpus. The expectation is that these values are especially relevant for identifying whether the application is more likely to be malicious versus benign.

For example, one feature value might be a single binary digit (0 or 1) representing whether the file is digitally signed. This feature might be relevant since in practice illegitimate applications are infrequently digitally signed. Another relevant feature might be the size of the file containing the software application. This feature might be relevant since malicious applications tend to have a smaller size than benign ones. It is important to note that any single feature might not yield any conclusive evidence over whether an application is legitimate, but examining a plurality of such feature values could provide conclusive evidence. It is also important to note that in many instances the kind of features to use is often determined through specific domain expertise rather than being derived automatically. For example, it might require domain expertise to determine that knowing whether a file is digitally signed is valuable information.

Once feature vectors are extracted from the training corpus, then these vectors, together with the labels associated with any of the files themselves, are fed into an algorithm that implements the "training phase." The goal of this phase is to automatically derive a "model". A model effectively encodes a mathematical function whose input is a feature vector and whose output is a classification. In the context of using machine learning to detect malware, the output of the model (when applied to a file whose disposition is being sought) might be a binary label of either "benign" or "malign". Certain machine learning models are also capable of producing a score that reflects the confidence in the label. For example, the output might be ("malign", 0.95) which can be taken to mean that the model believes that the feature vector has a 95% chance of corresponding to a malicious software application. A machine learning algorithm should ideally produce a classifier that is reasonably consistent with the training examples and that has a reasonable likelihood of generalizing to new instances. Generalization is important since it is expected that in practice the model will be evaluated on instances whose dispositions are not already known.

Specific machine learning algorithms in the art include the Naive Bayes Algorithm, Artificial Neural Networks, Decision Trees, Support Vector Machines, Logistic Regression, Nearest Neighbors, etc. The term classifier is also used to describe a model. For example, one may refer to a Support Vector Machine classifier. Once the model/classifier is established, it can be used to evaluate new instances of software that are presented to a computer or computer network in practice.

In the context of detecting malware, a client system would first extract the feature vector associated with a software application and then apply the model to that feature vector to obtain a disposition and optionally a confidence. The attributes in the feature vector comprise attributes of the software application as well as contextual attributes of the system it is running on. Finally, the client system would apply a policy based on this information. The actual classification process need not happen locally on the client. Instead, it could be performed on a remote server, in which case it is expected that the client will transmit an encoding of the feature vector to the server. The policy associated with the final classification could be complex if the classification also includes a confidence value. For example, if a system is highly critical or holds very sensitive information, then an application might be blocked unless there is a high likelihood of it being benign. On the other hand, if the system is not as sensitive then, the converse stance can be taken. Specifically, only applications that have a high likelihood of being malicious would be blocked.

The following description will also make use of the concept of a log, which is known in the art. A log is a record of transactions and actions made on a given system. For example, if a system were a web server, then a log would comprise a description of the plurality of clients who connected to the system, the times they connected, and what actions they took. With a log, on can construct a reasonable synopsis of what happened on a given system. In the context of an Anti-Virus system, including one that uses a server component for assisting a client that desires a disposition for a given software application, a log entry could include, but not necessarily be limited to, the following: a client identifier that can be used to link disparate transactions from the same client, a timestamp specifying the time a client made a particular request for the disposition of a particular application, the location of the client (as specified by its Internet Protocol or IP address), a description of the file whose disposition is being requested (e.g., as encoded by a file fingerprint such an MD5 or a SHA-256), any Anti-Virus fingerprints associated with the application (including, but not limited to traditional fingerprints and generic fingerprints), attributes of the software application in question (including, but not limited to a machine learning feature vector of the attributes of the application of interest), contextual data about the application of interest that may aid in determining its disposition, the response of the server component (including, but not limited to the final assigned disposition of the application, a sub-disposition that provides additional description about the application such as that the application was previous unseen or is common in the field, the recommendation the server makes to the client about that application, and the dispositions assigned by different sub-technologies that were used in the process of coming up with a final disposition, and a caching time or time-to-live for the response that indicates how long the response might be valid for).

Since queries to a server can be complex and multi-faceted, the log entry can also include an entry that specifies a query type. For example, in one query to a server, a client might only include a basic fingerprint. In a subsequent query for the same file the client might include additional information. These two queries can be recorded separately with different query types (though when analyzing the logs, it might help to link the fact that the same client made two queries about the same file). A log would them comprise a plurality of log entries transmitted by a plurality of clients. In the context of the disclosed invention, the machine learning techniques that will be deployed can be trained directly off of log data.

In one embodiment of the present invention, the client and server components would function as follows. During the initialization phase, the server would train a classifier. In one embodiment, the training data can be taken directly from actual existing user logs where a fingerprint for a file was submitted earlier and was classified possibly through independent means. For example, the file might have been known to be benign or malicious because of its presence on an existing whitelist or blacklist.

The log data can be optionally stratified or partitioned based on different criteria such as whether the users have natural groupings and sub-groupings that can include, but not be limited to, geographic groupings (i.e., the users are from similar locales) and affiliate groupings (that is, the users might be affiliated with each other—for example, they may all be members of the same enterprise or may have acquired the system or software of the invention through a common source—such as a common download server or common distribution channel). If the training data is stratified or partitioned according to some criteria, then the training data used can be derived from a plurality of partitions or strata from the logs. A benefit of partitioning the training data is that machine learning classifiers can be fine-tuned to a specific portion of the input space and as a result can have improved performance on instances of this portion of the space. The training phase would have multiple parameters. Once a classifier is developed, it may be deployed in the field.

In one embodiment, one could automatically generate actual computer instructions (or some appropriate encoding of computer instructions that can be subsequently interpreted) that implements the mathematical function specified by the classifier. In one embodiment, these instructions can be stored on a remote server. In an alternative embodiment, these instructions can be transmitted to a plurality of client systems.

In another embodiment of the present invention, when a client system encounters a new software application, it would extract a feature vector associated with this application together with any other data that might independently determine if the application is benign or malign. The feature vector need not be limited to attributes of the specific application, but could also include other attributes of the system on which the application is running The attributes in the feature vector associated specifically with the binary contents of the application could include, but not be limited to, the following: properties of the binary contents of the application; list of Dynamic Linked Libraries (DLLs) referenced by the application; values of specific positions within the binary contents; the number of sections, number of symbols, and positions of the different sections of the binary; size of the binary.

In some embodiments, the feature vector will include an encoding of which Dynamic Linked Libraries are referenced by the application. In other embodiments, the feature vector will include the number of sections, number of symbols, and positions of the different sections of the binary. In other embodiments, the feature vector will include the size of the binary. Attributes of the feature vector associated with the application in general could include, but not be limited to: information about the registry keys used in the application as well as any modifications made to the registry (typically for threats that execute on Windows); the filename of the application; behavioral attributes of the application, such as network ports used and Application Programmer Interface calls made; files modified and created by the application; and services stopped or started by the application.

In some embodiments, the feature vector will include the filename of the application and registry keys used. Attributes of the feature vector associated with general context of the application could include, but not be limited to: the processes running on the system at the time the application is encountered; the source of the application (e.g., CD ROM, USB Stick, Web Site); the infection history of the machine; the geographic location of the machine; and the IP address of the machine. In some embodiments, the feature vector would include the source of the application and the processes running on the system at the time the application is encountered. In other embodiments, the feature vector would include the IP address of the machine. In general, the feature vector would include information about a plurality of these features.

It should be borne in mind that in constructing the feature vector, the foregoing feature values need not be transmitted verbatim, but would be encoded in a way that facilitates the application of machine learning techniques. For example, rather than listing every Dynamic Linked Library associated with an application, instead a binary value can be used to denote whether a specific Dynamic Linked Library was used, such as winsock.dll. In one embodiment, in addition to the feature vector, the client can compute a traditional fingerprint such as a SHA-256 or a generic fingerprint such as one obtained through PEHash or SSdeep (both of which are known in the art), or a combination of both. While the feature vector is primarily relevant in classifying the file using the machine learning techniques that have been outlined in the foregoing, the other data might be of use for future training. For example, a file whose disposition was unclear at the time it is first encountered might be subsequently found on a blacklist of known malicious applications. If that list is indexed by SHA-256, then having both the client compute both the SHA-256 value as well as the feature vector would subsequently allow the feature vector to be associated with a specific disposition. This feature vector can then be added to the training corpus for future training phases.

In one embodiment of the present invention, the client can take the feature vector value and compress it. While there are general-purpose techniques in the art for compressing data, for this particular instance, special-purpose techniques that yield desirable performance parameters, particularly with respect the amount of data communicated between the clients and the server could also be used.

Upon optionally compressing this feature vector, in one embodiment of the present invention, the resulting data would be transmitted to a remote server. The client may alternatively store the logic associated with the server so that a remote look-up is avoided.

In one embodiment of the present invention, the server would decompress, if necessary, the data transmitted by the client, which includes the feature vector provided by it, and then evaluate the feature vector against the model it has in place. If the client provided other data such as a traditional fingerprint or a generic fingerprint, then the server can optionally override the results from the classifier with a disposition arrived through more traditional means. For example, if the client transmitted the SHA-256 value of the application is it concerned with, and this value happens to be on a known whitelist of good applications, then the server can respond that the application in question is good regardless of what the machine learning model says. The premise behind this approach is that the machine learning model may be more fallible than a direct whitelist or blacklist (though one should keep in mind that whitelists and blacklists have limitations as well—e.g., they may only have a modest number of entries, whereas a machine learning model can be applied to any file, even one that was not previously known). The server would then provide a response to the client regarding what its ultimate verdict was together, if necessary, with information on what actions it would like the client to perform. The transaction record associated with this transaction, comprising a client identifier, a timestamp, the feature vector values, the other fingerprint values, and the ultimate disposition and information on how that disposition was derived, information on what type of action the server would like the client to perform, among other things, is optionally recorded. This transaction record can be used subsequently in the training phase of a new classifier since it has three desirable characteristics of a training corpus. First, it contains a feature vector that can be provided as input into a machine learning training algorithm. Second, it contains a disposition, which many training algorithms require. It should be borne in mind, however, that for training purposes it would be desirable to use dispositions attained through independent means like generic or specific fingerprints rather than previous machine learning based dispositions, otherwise there is a risk of introducing a circular feedback loop. Third, the training example generated from this data is coming from an actual user instance in the field and hence is likely to be a good representation of what a typical user will encounter in the future.

In one embodiment of the present invention, the client would receive a verdict from the server as well as possible actions associated with that verdict, and act in accordance with that response according to a specified policy. In one embodiment, the possible response could comprise, but not be limited to, the following: convicting the application (i.e., removing it from the system or blocking a user from installing it) and optionally transmitting a copy to the server; or allowing the application to stay on the system; and/or requesting the application to be transmitted from the client to the server for additional analysis.

The last option would, for example, be relevant if the server thinks that the application is potentially malicious, but its confidence is not high enough and has an uncomfortably high risk of causing a false positive (in this case, by transmitting the file to the server, additional more extensive analysis can be performed on it—such analysis might be too expensive to perform for each file encountered, but might be suitable when applied just to the subset of files that are suspicious).

In one embodiment of the present invention, the server can put a number of safeguards in place to reduce the risk that a given benign application is incorrectly called malicious. These safeguards can include, but are not limited to the following. First, as mentioned in the foregoing, if the application is known to be good through a more direct means (such as the traditional fingerprint, like a SHA-256, matching one on a known whitelist of good software applications), then the server can override the disposition provided from the machine learning classifier. Second, the use of the machine learning classifier can be throttled. For example, the server can limit the number of convictions associated with this classifier to a modest number. Even further, the number of classifications associated with a given application can be throttled. For example, for every SHA-256, it can be convicted no more than N times (for a modest choice of N like 3) using machine learning classifiers. This measure would ensure that if there is a mistake, its damage would be contained (and since most malicious software tends to have low frequency because of its fly-by-night danger, this type of throttling can yield a favorable tradeoff between the detection rate and false positive rate). Third, convictions with a machine learning classifier could be restricted to certain classes of files that have a slightly higher likelihood of being malicious. For example, it is known in the art that files with a smaller size have a higher likelihood of being malicious compared to larger files. This is the case since malicious parties have a higher chance of success of transmitting a smaller file onto a victim's machine. It is also known in the art that digitally signed files have a smaller likelihood of being malicious compared to digitally unsigned files. Similar considerations can apply for other file attributes as well. Therefore, in one embodiment of the present invention, machine learning classifier based convictions can be optionally restricted specifically to software applications whose size is below a certain threshold and that are not digitally signed. Fourth, convictions with a machine learning classifier can be reserved for specific situations.

In one embodiment of the present invention, if a machine has a propensity for getting infected with a specific threat (for example, it has encountered this type of threat previously or it is in a geographic region associated with a particular threat), then we can apply a machine learning classifier to such cases. Fifth, classifiers can be made to model specific threat instances. For example, one popular malicious software threat in the art is known as Conficker. There are many variations of Conficker, but there is sufficient commonality among these variations to view them as part of the same overall family. In one embodiment of the present invention, therefore, a classifier can be trained specifically to target a specific threat. To do so, the clean files and feature vectors in the corpus can remain the same, but only malicious files and feature vectors associated with a specific threat can be included. A benefit of this approach is that a classifier which is fine-tuned to a specific threat might yield a low false positive rate for that threat and also some end-users might desire to know which particular threat targeted their system. Sixth, the application of the classifiers can be restricted to files whose popularity is below a specified threshold. In one embodiment, a parameter N can be introduced into the system and an application would only be convicted if fewer than N systems appear to have this application. Seventh, the application of some classifiers can be restricted to situations in which the system in question has a slightly higher chance of being infected with a threat. Indicators that suggest an increase in likelihood of being infected include, but are not limited to, an observation of recent infections on the system, knowledge that the system was recently targeted for attack, the presence of vulnerable software applications on the system, the presence of applications on the system that are common vectors for infections (such as Peer-to-Peer file sharing clients), and the presence of open network ports on the system.

It should be borne in mind, however, that practices that attempt to reduce the false positive rate also generally reduce the detection rate since some actual malware might be inadvertently be called good as a result of this safety net. In the art, it is acknowledged that such a tradeoff exists and depending on the specific application, it would be determined whether this tradeoff happens to be desirable. For example, if the risk of a false positive is reduced dramatically whereas the detection rate is only reduced slightly, then the tradeoff may be favorable. Alternatively, if the cost of a false positive is very high, which is very possible given that blocking a legitimate application could translate into monetary business losses, then it may be desirable to take a more conservative stance that reduces it substantially even if that creates a corresponding substantial drop in detection rate. On the other hand, if the cost of a missed detection (or false negative) is very high, such as what might happen for a system that needs to be highly secured, then a high false positive rate might be tolerable so long as the risk of a threat infiltrating the system is made very small.

Figure 6:
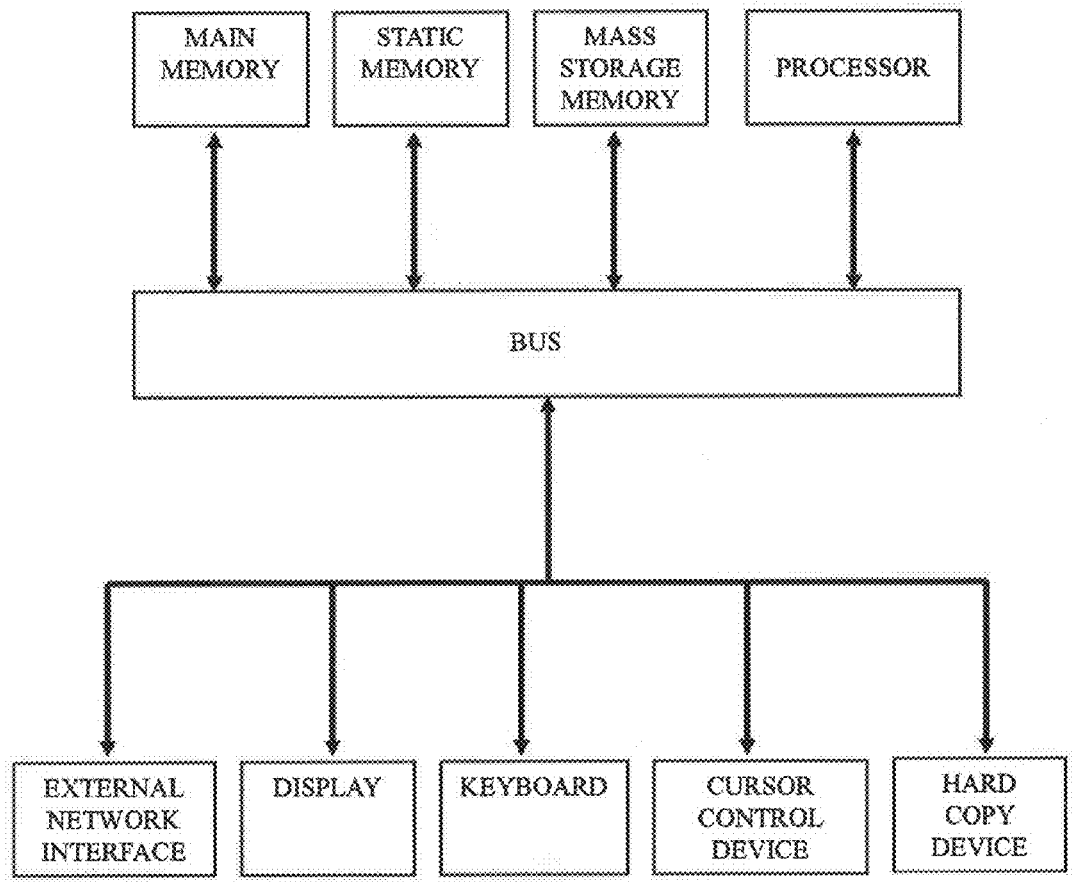
FIG. 6 is representation of an exemplary computer system.

FIG. 6 is a block diagram of an exemplary computer system that may perform one or more of the operations described herein. Referring to FIG. 6, the computer system may comprise an exemplary client or server computer system. The computer system comprises a communication mechanism or bus for communicating information, and a processor coupled with a bus for processing information. The processor includes a microprocessor, but is not limited to a microprocessor, such as, for example, Pentium, PowerPC, Alpha, etc. The system further comprises a random access memory (RAM), or other dynamic storage device (referred to as main memory) coupled to the bus for storing information and instructions to be executed by the processor. Main memory also may be used for storing temporary variables or other intermediate information during execution of instructions by the processor.

The computer system also comprises a read only memory (ROM) and/or other static storage device coupled to the bus for storing static information and instructions for the processor, and a data storage device, such as a magnetic disk or optical disk and its corresponding disk drive. The data storage device is coupled to the bus for storing information and instructions. The computer system may further be coupled to a display device, such as a cathode ray tube (CRT) or liquid crystal display (CD), coupled to the bus for displaying information to a computer user. An alphanumeric input device, including alphanumeric and other keys, may also be coupled to the bus for communicating information and command selections to the processor. An additional user input device is cursor control, such as a mouse, trackball, track pad, stylus, or cursor direction keys, coupled to the bus for communicating direction information and command selections to the processor, and for controlling cursor movement on the display. Another device that may be coupled to the bus is a hard copy device, which may be used for printing instructions, data, or other information on a medium such as paper, film, or similar types of media. Furthermore, a sound recording and playback device, such as a speaker and/or microphone may optionally be coupled to the bus for audio interfacing with the computer system. Another device that may be coupled to the bus is a wired/wireless communication capability to communication to a phone or handheld palm device.

Note that any or all of the components of the system and associated hardware may be used in the present invention. However, it can be appreciated that other configurations of the computer system may include some or all of the devices.

Example 1

This example illustrates a specific instance of the invention, describing the steps and actions along the way. This example is provided to help clarify the description, and it should not be considered limiting in any way. For example, the above invention description covers many variations and extensions. To avoid obscuring the description, these variations and extensions are not discussed below.

To begin, consider a piece of agent software running on a user's machine. According to this example, the agent software contains a Microsoft Windows filesystem mini-filter driver that can detect when a new (executable) file is being written to the file system. Other software that can detect when a new executable file is being written to the file system can also be used. Following notification that there has been or is an attempt to write a file to the file system, the software agent computes two values. First, it computes a "traditional" fingerprint, such as a SHA-256, on the file. Second, it computes a machine learning feature vector from the file. The feature vector will comprise a number of attributes associated with the file on this system, including, but not limited to: which DLLs are referenced by the application, the values of specific positions of the binary contents, the number of sections in the file (and any attributes associated with those sections—such as whether it is readable, writeable, or executable), the number of symbols, the size of the binary, whether the binary is digitally signed, etc. All of these attributes are easily computed from the binary contents of the file. In addition, other contextual pieces of information are included in the feature vector, including, but not limited to, the file system timestamp, properties of the filename (note that the same file may have different names on different systems, so this attribute is specific to an instance of the file on a given system), information about other software applications installed on the system (e.g., whether the system has any vulnerable software or software that commonly leads to a system infection, etc.), and recent infection history of the system (e.g., such as whether the user experienced any infections in the last half an hour). These attributes are encoded appropriately, and compressed as well (for compact transmission).

The client then sends the fingerprint and the feature vector to a server. In addition to these two values, the client may optionally include an identifier (to help link other transactions from the same client).

The server, in turn, first looks up the file in any blacklists and whitelists (using, for example, the traditional fingerprint to perform this look-up). If this look-up results in a conclusive disposition (e.g., the file is conclusively known to be malicious or benign), then this disposition is communicated to the client. The server at this stage can optionally look-up additional information about the file (e.g., how many users it has, etc.), and then store the fingerprint, the basic feature vector, the additional information, the timestamp of the query, the user's identifier, and the disposition per the blacklists/whitelists. The storage format may be a server transaction log.

If the server does not find the file in any blacklists or whitelists, then it will perform the following steps. First, it can optionally augment the feature vector provided by the client with other attributes that it is able to compute. These attributes can include, but not be limited to, the frequency with which the file appears in the user base and a server-side time stamp representing the first time the file was ever seen on the server.

The server then evaluates this augmented feature vector using a machine learning classifier (e.g., a Support Vector Machine, Decision Trees, Neural Networks, etc.). The client is provided with a disposition (e.g., malicious/benign) and an optional confidence rating, and the transaction is logged for future analysis.

Periodically, the server can scour through all previous logs and retrieve all feature vectors associated with files whose fingerprints are on known whitelists/blacklists. The server can create a training corpus associated with the feature vectors corresponding to fingerprints from known whitelists and blacklists (i.e., those items on the whitelists would be the "benign" subset of the corpus and those items on blacklists would on the "malicious" subset of the corpus.

A machine learning classifier (e.g., a Support Vector Machine, Decision Trees, Neural Networks, etc.) can be trained on this corpus. Note that there are severeal ways to initiate or "jumpstart" the system. We can begin with a data collection phase (e.g., imagine some type of silent detection capability).

Whereas many alterations and modifications of the present invention will no doubt become apparent to a person of ordinary skill in the art after having read the foregoing description, it is to be understood that any particular embodiment shown and described by way of illustration is in no way intended to be considered limiting.

The invention claimed is:

1. One or more non-transitory computer readable storage media encoded with instructions that, when executed by one or more computer processors, cause the one or more computer processors to perform operations comprising:
   before execution of a software application, extracting a feature vector from the software application by applying a mathematical transformation operation to the software application to generate a series of values that represents features of the software application and that is indicative of whether or not the software application is likely to be benign or malicious; and
   generating information indicative of a maliciousness of the software application by applying said feature vector to a classification algorithm concerning whether said software application is benign or potentially malicious, wherein the classification algorithm produces a score that represents a confidence in its determination as to whether the software application is benign or malicious.

2. The non-transitory computer readable storage media of claim 1, further comprising instructions operable to perform operations including:
   causing transmission of said feature vector to a server application that performs the generating information indicative of a maliciousness of the software application.

3. The non-transitory computer readable storage media of claim 1, further comprising instructions operable to perform operations including:
   accessing in a training phase a body of training data including a set of software applications; and
   deriving during said training phase the classification algorithm for determining whether software applications are likely benign or malicious based on the training data.

4. The non-transitory computer readable storage media of claim 1, wherein the data used to derive the classification algorithm is based on transaction logs of actual client systems.

5. The non-transitory computer readable storage media of claim 1, wherein the classification algorithm is developed using a machine learning method including one or more of: Support Vector Machines, Neural Networks, Decision Trees, naive Bayes, or Logistic Regression.

6. The non-transitory computer readable storage media of claim 1, further comprising instructions operable for comparing output of the classification algorithm to results from one or more other processes for identifying malicious software.

7. The non-transitory computer readable storage media of claim 1, further comprising instructions operable for determining how to treat the software application based on results of the classification algorithm.

8. One or more non-transitory computer readable storage media encoded with instructions that, when executed by one or more computer processors, cause the one or more computer processors to perform operations comprising:
   accessing in a training phase a body of training data including a set of software applications to derive during said training phase a classification algorithm for determining whether selected software applications are likely benign or malicious;

receiving a feature vector relating to a software application of interest, wherein the feature vector is generated by applying a mathematical transformation operation to the software application of interest and the feature vector includes a series of values that represents one or more features of the software application of interest indicative of whether or not the software application of interest is likely to be benign or malicious;

applying the feature vector to the classification algorithm; and generating information indicative of a maliciousness of the software application of interest based on results of the application of the feature vector to the classification algorithm.

9. The non-transitory computer readable storage media of claim 8, wherein the feature vector is received from a client application, and further comprising instructions that, when executed by the one or more computer processors, are operable to transmit to the client application the information indicative of the maliciousness of the software application of interest.

10. The non-transitory computer readable storage media of claim 8, wherein the classification algorithm produces a score that represents confidence in its determination as to whether the software application is benign or malicious.

11. The non-transitory computer readable storage media of claim 8, wherein the data used to derive the classification algorithm is taken directly from transaction logs of actual client systems.

12. The non-transitory computer readable storage media of claim 8, wherein the classification algorithm is developed using a machine learning method including one or more of: Support Vector Machines, Neural Networks, Decision Trees, naive Bayes, or Logistic Regression.

13. The non-transitory computer readable storage media of claim 8, wherein the feature vector is encoded or compressed.

14. The non-transitory computer readable storage media of claim 8, wherein the body of training data includes actual in-field usage data.

15. The non-transitory computer readable storage media of claim 8, further comprising instructions operable for comparing output of the classification algorithm to results from another algorithm used to identify malicious software.

16. An apparatus comprising:
one or more network interfaces configured to transmit and receive data on a computer network;
a processor coupled to the network interfaces and configured to execute one or more processes; and
a memory configured to store instructions executable by the processor, when executed causing the processor to perform operations comprising:
  accessing in a training phase a body of training data including a set of software applications to derive during said training phase a classification algorithm for determining
whether selected software applications are likely benign or malicious;
  receiving a feature vector relating to a software application of interest, wherein the feature vector is generated by applying a mathematical transformation operation to the software application of interest and the feature vector includes a series of values that represents one or more features of the software application of interest indicative of whether or not the software application of interest is likely to be benign or malicious;
  applying the feature vector to the classification algorithm; and
  generating information indicative of a maliciousness of the software application of interest based on results of the application of the feature vector to the classification algorithm.

17. The apparatus of claim 16, wherein the feature vector is received from a client application, and wherein the processor is operable to cause the information indicative of the maliciousness of the software application of interest to be transmitted, via the network interfaces, to the client application.

18. The apparatus of claim 16, wherein the classification algorithm produces a score that represents confidence in its determination as to whether the software application of interest is benign or malicious.

19. The apparatus of claim 16, wherein application of the classification algorithm is restricted to files whose popularity is below a specified threshold such that the software application of interest is flagged as being malicious if fewer than a predetermined number of systems appear to use the software application of interest.

20. The apparatus of claim 16, wherein the feature vector includes information indicating one or more of: which dynamic linked libraries are referenced by the application, values of specific positions of binary contents, number of sections in a file and any attributes associated with those sections, number of symbols, size of a binary file, whether the binary file is digitally signed, a file system timestamp, properties of a filename, other installed software applications, or recent infection history.

* * * * *